(12) United States Patent
Yu

(10) Patent No.: US 7,021,480 B2
(45) Date of Patent: Apr. 4, 2006

(54) STACKABLE CONTAINER ASSEMBLY

(76) Inventor: Zu Sheng Yu, 31 Bayview Dr., Huntington, NY (US) 11743

( * ) Notice: Subject to any disclaimer, the term of this patent is extended or adjusted under 35 U.S.C. 154(b) by 90 days.

(21) Appl. No.: 10/631,686

(22) Filed: Jul. 31, 2003

(65) Prior Publication Data

US 2005/0023279 A1 Feb. 3, 2005

(51) Int. Cl.
*B65D 21/032* (2006.01)

(52) U.S. Cl. .................................... 220/4.27

(58) Field of Classification Search ............... 220/4.27
See application file for complete search history.

(56) References Cited

U.S. PATENT DOCUMENTS 3,811,559 A * 5/1974 Carter .................. 206/545
5,542,206 A * 8/1996 Lisch .................... 43/54.1

* cited by examiner

*Primary Examiner*—Stephen Castellano
(74) *Attorney, Agent, or Firm*—F. Chau & Associates, LLC

(57) ABSTRACT

Stackable container assembly having a utility function includes an entrance, a plurality of intermediate members, and a base. A stackable container assembly has an entrance, a plurality of intermediate members, and a base. The entrance has a central aperture, a lower downwardly depending stem, and a lower lip. Each of the intermediate members having an upper lip, a lower lip, side walls, and a bottom surface for forming a container space. The base has an upper lip, sidewalls, and a bottom surface.

10 Claims, 2 Drawing Sheets ized to fit into an open upper

STACKABLE CONTAINER ASSEMBLY

BACKGROUND OF THE INVENTION

1. Field of the Invention

The present invention relates to stackable containers or kitchenware; more specifically, kitchenware, when stacked, forms an assembly for a different usage.

2. Description of the Related Art

Living space such as homes, apartments, hotels etc. are sold or rented at prices proportionally to usable areas of space. In more crowded areas or popular cities, usable space comes at a premium price. Numerous utensils, accessories or items in living quarters are made to be space efficient. For example, a sofabed is used both as a sofa and a bed. It is space efficient because the bed is folded away when not used. For the kitchen, people stack food containers, bowls, plates, or cups to save space. However, different containers have different sizes and shapes of openings and bottoms. This makes it hard to stack them upright. Moreover, because of the different sizes the stacked containers appear cluttered and are not eye-pleasing.

SUMMARY OF THE INVENTION

According to one embodiment of the present invention, a stackable container assembly has an entrance, a plurality of intermediate members, and a base. The entrance has a central aperture, a lower downwardly depending stem, and a lower top. Each of the intermediate members has an upper lip, a lower lip, sidewalls, and a bottom surface for forming a container space. The base has an upper lip, sidewalls, and a bottom surface.

Preferably, at least the entrance and an intermediate member is made of a transparent material. The combination of entrance and an intermediate member configures a space, usable for holding liquid or other decorative items such as flowers.

According to another embodiment of the present invention, a stackable container assembly is used to form a separate utility function, for use such as a vase, an urn, or a pot. The assembly comprises an entrance, a plurality of intermediate members, and a base. When the entrance, intermediate members, and a base are coupled to each other, the separate utility function is formed. The entrance has a central aperture, a lower downwardly depending stem, and a bottom lip. Each of the intermediate members has an upper lip, a bottom, sidewalls, a bottom surface for forming a container space, and a bottom lip. The intermediate members store other kitchenware. The base has an upper lip, a bottom, sidewalls, and a bottom surface.

Alternatively, an aspect of the present invention provides a stackable container assembly with stackable members which when stacked, form an article having other utility functions.

BRIEF DESCRIPTION OF THE DRAWINGS

These and other features of the present invention may be better and more completely understood by studying the following detailed description of the presently preferred embodiments together with the drawings, of which.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein.

The stackable container assembly according to embodiments of the present invention will be described with reference to the drawings.

Figure 1:
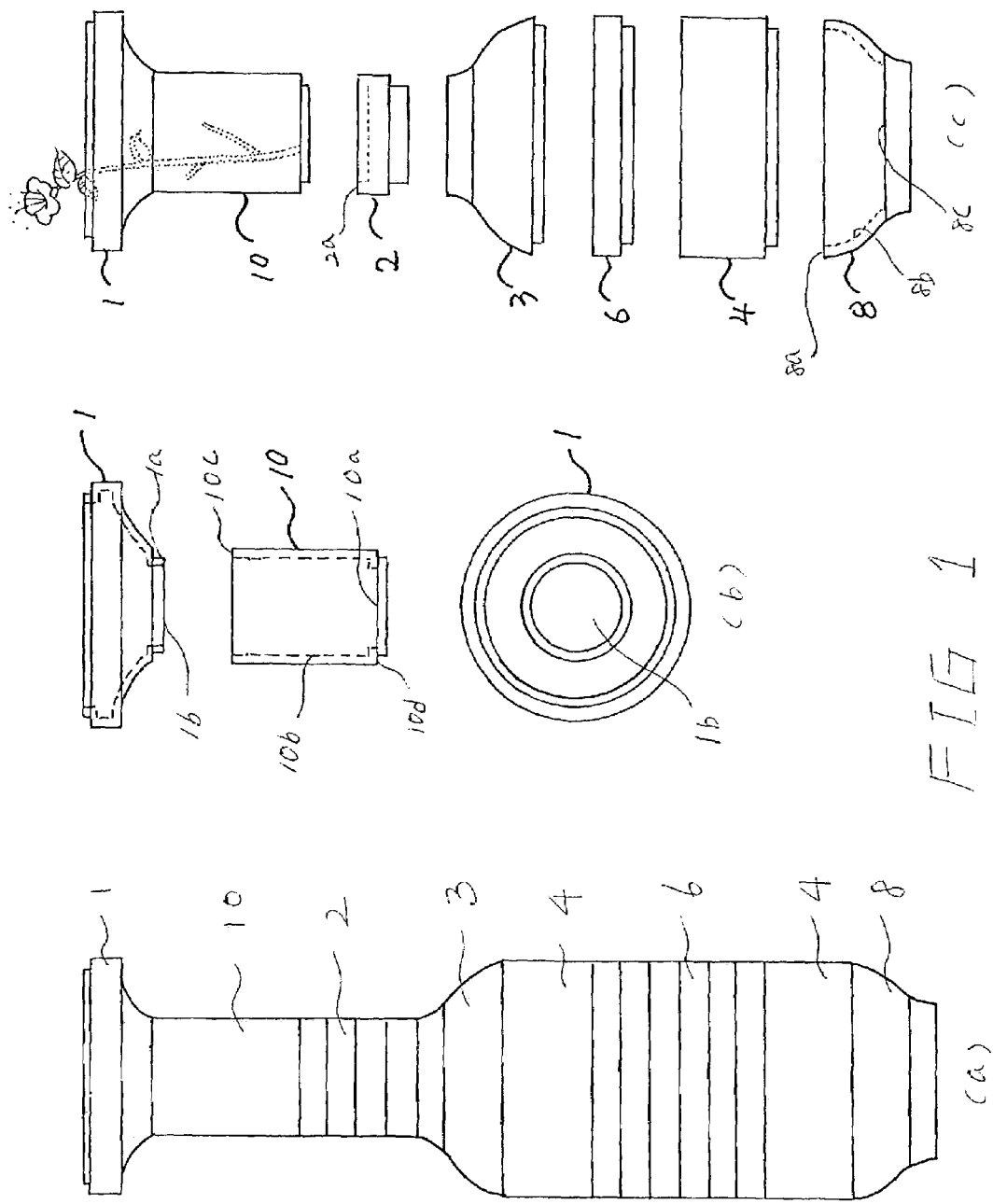
FIG. 1(a) is a side view of a stackable container assembly according to an embodiment of the present invention.
FIG. 1(b) is a side and a top view of an entrance, and a side view of an intermediate member.
FIG. 1(c) is a side view of a stackable container assembly showing separate members of the assembly.
Figure 2:
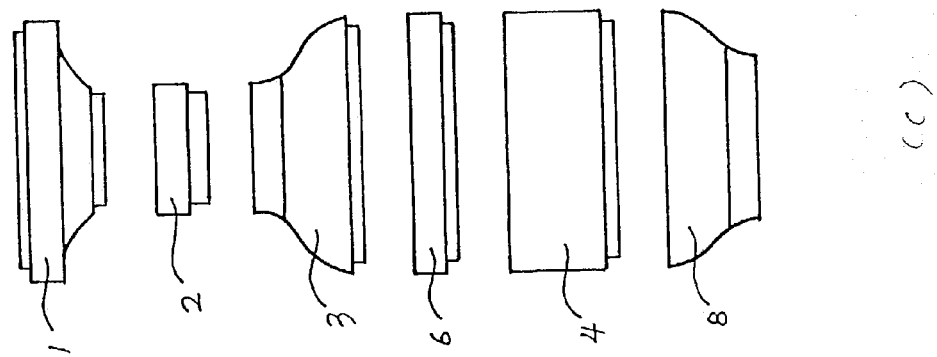
FIG. 2(a) is a side view of a stackable container assembly according to another embodiment of the present invention.
FIG. 2(b) is side views of a few intermediate members.
FIG. 2(c) is a side view of a stackable container assembly showing separate members.
Figure 2:
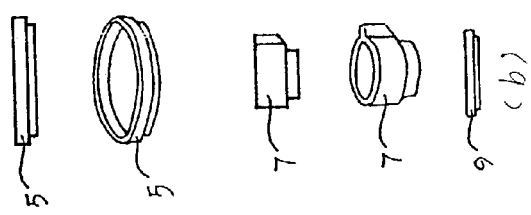
Figure 2:
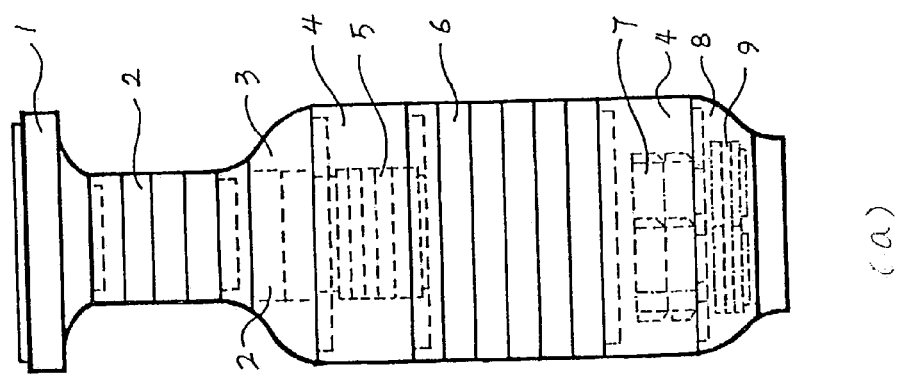

Referring to the Figures, a container assembly in accordance with the present invention, designated generally as 100, includes an entrance 1, at least one intermediate member (2, 3, 4, 6, and 10), and a base 8. As illustrated in FIGS. 1 and 2, when entrance 1, intermediate members (2, 3, 4, 6, and 10), and base 8 are stacked together, they are in substantial alignment and the stacked container assembly provides a separate utility function and configuration, for example, forming a vase, an urn, or a pot. Intermediate members (2, 3, 4, 6, and 10) and base 8 can be any kind of kitchenware including bowls, plates, and cups, which can be in a variety of colors including blue, green, yellow, pink, red and more. The intermediate members (2, 3, 4, 6, and 10) and base 8 are made of a variety of rigid materials such as ceramic, metal, or plastic. The intermediate members (2, 3, 4, 6, and 10) and base 8 also have variety of shapes and sizes not limited to the drawings of the present invention.

Each intermediate member has an upper lip and a lower lip, the upper lip for receiving a mating lower lip of another intermediate member. The intermediate member also has a closed bottom, providing use as a separate container, bowl, dish, etc. when it is not stacked. For example, for intermediate member 10, there is bottom surface 10a, sidewalls 10b extending to an upper lip 10c, forming the upper lip 10c. Bottom portion has lower lip 10d for releasably coupling with an upper lip 2a of intermediate member 2. The height of sidewalls 10b of intermediate member is greater than a lower stem 1a. As a result, when an upper intermediate member, couples a lower intermediate member, the combination is fully received within the lower intermediate member. According to this embodiment, the sidewalls of these intermediate members are circumferential and may extend vertically as in intermediate member 10 or curved, as in intermediate member 3. Intermediate member 4 releasably engages base 8. Base 8 has an upper lip 8a, sidewalls 8b, and a bottom surface 8c. Bottom of base 8 is substantially flat to support container assembly 100 in an upright position.

Referring to FIG. 1, there is illustrated therein a stackable container assembly according to one aspect of the present invention. The container assembly 100 comprises an entrance 1, which could be a mouth of a vase, provided with a central aperture 1b that is adapted to receive flowers 12, and provided with a lower downwardly depending stem element 1a which is dimensioned to fit into an open upper lip 10c of one of intermediate members. The combination of entrance 1 and an intermediate member 10 configures a space for placing flowers 12. The combination may be filled with water to sustain cut flowers 12. According to a preferred embodiment, the combination is rmade with a transparent material to facilitate view of the flowers through the transparent material.

Referring to FIG. 2, there is illustrated therein a stackable container assembly according to another aspect of the present invention. Empty space of the intermediate member 3 and 4 can be used as an extra storage space for other containers such as bowls 2, plates 5 and 9, cups 7, and more.

As described above, the stackable containers not only enhance aesthetic appearance, but are also space efficient.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A stackable container assembly having an entrance, a plurality of intermediate members, and a base comprising:
   the entrance having a central aperture, a lower downwardly depending stem, and a lower lip;
   each of the plurality of intermediate members having an upper lip, a lower lip, sidewalls, and a bottom surface for forming a container space; and
   the base having an upper lip, sidewalls, and a bottom surface, wherein the entrance, the plurality of intermediate members and the base are coupled to each other to form a vase.

2. The container assembly of claim 1, wherein at least the entrance and an intermediate member is made of a transparent material.

3. The container assembly of claim 1, wherein each of the intermediate members is a kitchenware usable as a bowl, dish, or plate.

4. The container assembly of claim 1, wherein empty space of at least one of the intermediate members stores other kitchenware.

5. The container assembly of claim 1, wherein the sidewalls are either curved or straight.

6. A stackable container assembly comprising:
   an entrance having a central aperture, a lower downwardly depending stem, and a bottom lip;
   a plurality of intermediate members, each of the intermediate members having an upper lip, a bottom, sidewalls, a bottom surface for forming a container space, and a bottom lip; and
   a base having an upper lip, a bottom, sidewalls, and a bottom surface, wherein when separated, each of the plurality of intermediate members is configured as kitchenware and when stacked, an assembly of the entrance, the plurality of intermediate members and the base is configured for a vase.

7. The container assembly of claim 6, wherein at least the entrance and an intermediate member is made of a transparent material.

8. The container assembly of claim 6, wherein each of the intermediate members is a kitchenware usable as a bowl, dish, or plate.

9. The container assembly of claim 6, wherein empty space of at least one of the intermediate members stores other kitchenware.

10. The container assembly of claim 6, wherein the sidewalls are either curved or straight.

\* \* \* \* \*